United States Patent [19]

Tomlinson

[11] Patent Number: 5,224,567
[45] Date of Patent: Jul. 6, 1993

[54] VEHICLE ANTI-THEFT DEVICE
[76] Inventor: Norvel Tomlinson, 2232 Stonegate, Denton, Tex. 76205
[21] Appl. No.: 806,245
[22] Filed: Dec. 13, 1991
[51] Int. Cl.$^5$ .............................................. B60R 25/04
[52] U.S. Cl. ..................................... 180/287; 307/10.3
[58] Field of Search ............... 180/271, 287; 307/10.2, 307/10.3, 10.4; 340/425.5, 426

[56] References Cited

U.S. PATENT DOCUMENTS

| | | | |
|---|---|---|---|
| 3,773,138 | 11/1973 | Killmeyer | 70/241 |
| 4,653,605 | 3/1987 | Goren et al. | 307/10.3 |
| 4,739,736 | 4/1988 | Branco | 180/287 |
| 4,804,856 | 2/1989 | Hanisko et al. | 180/287 |
| 4,832,146 | 5/1989 | Luby | 307/10.2 |
| 4,958,084 | 9/1990 | Carlo et al. | 307/10.2 |
| 4,987,406 | 1/1991 | Reid | 307/10.2 |
| 4,992,670 | 2/1991 | Pastor | 307/10.3 |
| 5,003,287 | 3/1991 | Peters et al. | 180/287 |
| 5,023,591 | 6/1991 | Edwards | 180/287 |

Primary Examiner—Richard M. Camby
Attorney, Agent, or Firm—Michael A. O'Neil

[57] ABSTRACT

A vehicle anti-theft device includes remotely operated relays for disabling the vehicle ignition and starter activated by a remote control or signal source that transmits an encoded radio frequency or infrared signal. A receive, including a decoder, located in the vehicle receives the signal and provides electrical pulses to flip flop switches that transmit electrical signals to selected trigger circuits. The trigger circuits generate short duration electrical pulses that are amplified to actuate the relays. An optional digital keypad mounted inside the vehicle may be used to close the relays in the event that the remote device is misplaced or lost.

4 Claims, 2 Drawing Sheets

VEHICLE ANTI-THEFT DEVICE

TECHNICAL FIELD

This invention relates to an anti-theft device for automobiles and other vehicles which provides increased security and more effective theft deterrence by isolating the vehicle ignition system and starter from their respective power sources to effectively disable the vehicle.

BACKGROUND OF THE INVENTION

Increases in the frequency of vehicle theft, in particular, automobiles and trucks, have led to higher insurance premiums and the development of a number of devices and systems designed to deter vehicle theft.

Various automobile anti-theft and security systems used in the past including devices with audible alarms or sirens that are triggered when an attempt is made to enter or start the vehicle without disarming the system. These systems malfunction frequently and are thus generally ineffective as they malfunction frequently giving a false alarm that may be confused with an actual attempt to steal the vehicle.

Other device systems have been designed to disable a vehicle in order to prevent its theft. Such devices and systems have not proven totally satisfactory for a number of reasons. In some cases, the disabling device can be overcome by "hot wiring" the ignition or by using an external power source to start the vehicle. In other cases, the anti-theft device or system is expensive and complicated or requires the user of the system to access the engine compartment of the vehicle to operate the system or device. Thus there is a need for an effective, economical vehicle anti-theft device that is convenient to use and which overcomes the limitations of prior art devices.

U.S. Pat. No. 3,773,138, issued Nov. 20, 1973 to Killmeyer; U.S. Pat. No. 4,653,605 issued Mar. 31, 1987 to Goren, et. al.; U.S. Pat. No. 4,739,736 issued Apr. 26, 1988 to Branco; U.S. Pat. No. 4,832,146 issued May 23, 1989 to Luby; U.S. Pat. No. 4,958,084 issued Sep. 18, 1990 to Carlo, et al.; U.S. Pat. No. 4,987,406 issued Jan. 22, 1991 to Reid; and U.S. Pat. No. 4,992,670 issued Feb. 12, 1991 to Pastor, all of which are incorporated herein by reference. None of the foregoing references however disclose the unique vehicle anti-theft device of the present invention.

Remote control devices are well known in the art and are currently used to operate garage door openers, television sets, video recorders and other devices. Such devices typically utilize a hand held transmitter that transmits an encoded radio frequency or infrared signal to a receiver that includes a decoder and a power source for actuating a device such as a garage door opener. These transmitters typically have a limited range and thus must be in close proximity to the receiver in order to actuate the device. The present invention relates to the use of such a remote control device as part of a unique tamper resistant vehicle anti-theft system that effectively disables a vehicle to deter theft of the vehicle.

SUMMARY OF THE INVENTION

The present invention provides a unique and effective vehicle anti-theft system which overcomes the limitation and drawbacks of prior art devices. The present invention includes remotely operated relays for disabling the vehicle ignition and starter. The relays may be enclosed in lockable enclosures to prevent tampering and are activated by a remote control or signal source that transmits an encoded radio frequency or infrared signal. A receiver, including a decoder, located in the vehicle receives the signal and provides electrical pulses to flip flop switches that transmit electrical signals to selected trigger circuits. The trigger circuits generate short duration electrical pulses that are amplified to actuate the relays. Thus the relays are successively opened and closed when the encoded signal is received.

An optional digital keypad mounted inside the vehicle may be used to close the relays in the event that the remote device is misplaced or lost.

DETAILED DESCRIPTION

Figure 1:
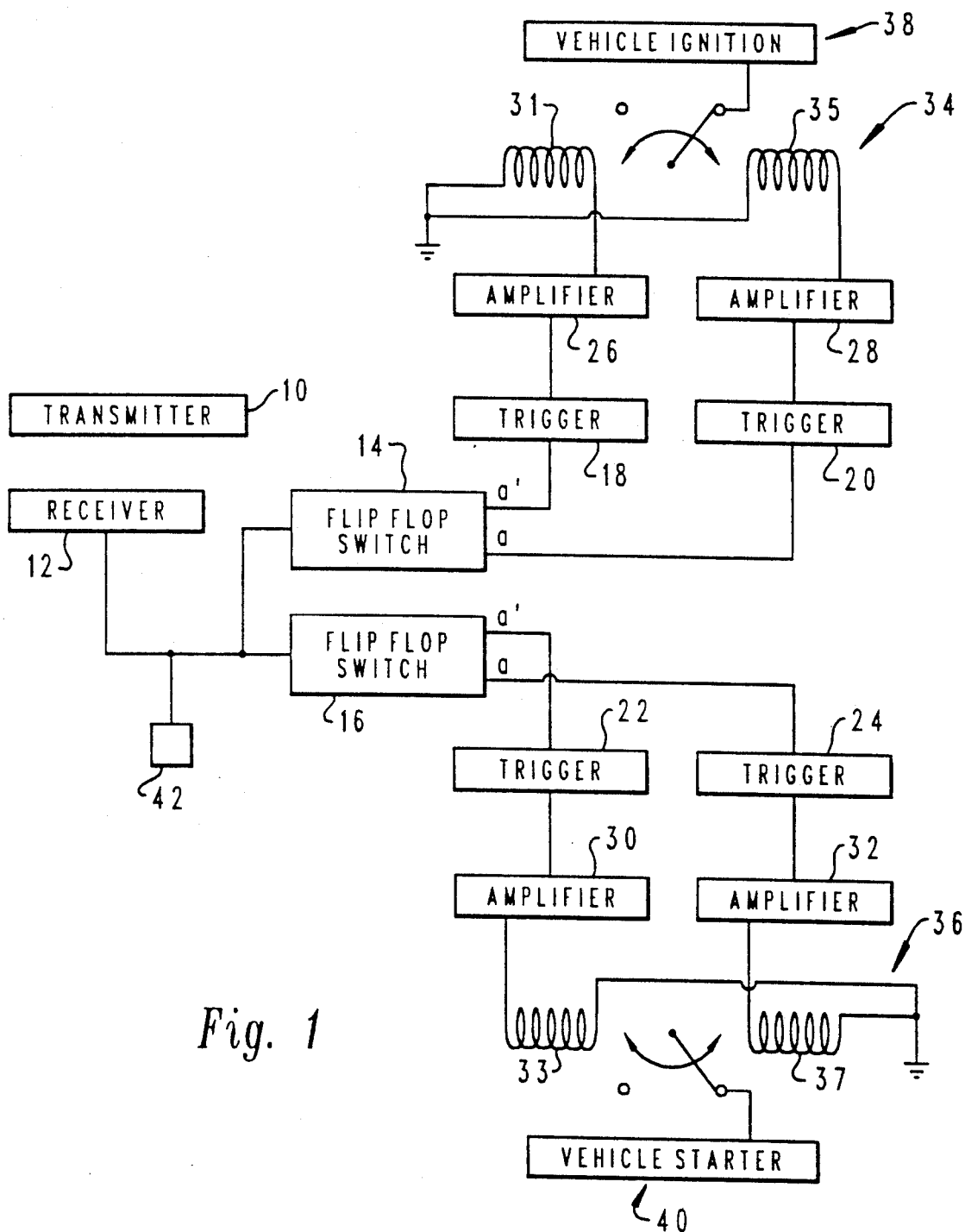
FIG. 1 is a schematic electrical diagram illustrating one embodiment of a system employing the vehicle anti-theft device of the present invention.

Referring now to FIG. 1, the vehicle anti-theft device is schematically represented. A portable transmitter 10 is used by the vehicle operator to transmit an encoded signal when the operator wishes to disable or enable the vehicle. Preferably transmitter 10 is small enough to be retained on a keyring or kept in a purse or pocket and is of the push button type that transmits an encoded signal only when the vehicle operator depresses a spring loaded push button. Receiver 12 is provided to receive and decode the transmitted signal and is preferably mounted in an unobtrusive location in, the vehicle. Depending on the type and strength of the signal generated by transmitter 10 and the sensitivity of receiver 12 the vehicle may be disabled or enabled from varying distances. For most applications, transmitter 10 and receiver 12 are selected so that the signal generated by the transmitter 10 can only be received by receiver 12 when the transmitter is in close proximity, e.g. several feet, of the vehicle. If the signal generated by the transmitter 10 is an infrared signal, it is necessary to mount receiver 12 in a location where a line of sight may be established between the transmitter 10 and receiver 12.

When the vehicle operator activates transmitter 10 while within the reception range of receiver 12, receiver 12 receives the encoded signal, decodes the signal and sends an electrical pulse or signal to flip flop switches 14 and 16. Flip Flop switches 14 and 16 are toggle or T type flip flop switches of the kind well-known in the art which change state upon reception of an electrical pulse. Referring to flip flop switch 14 for example, if the previous state of flip flop switch 14 corresponded to a, the next time an electrical pulse was received by flip flop switch 14, the state of the switch would change to a'.

Upon reception of an electrical pulse from receiver 12, flip flop switches 14 and 16 send electrical signals to trigger circuits 18 and 22 or 20 and 24, depending upon the previous position or state of flip flop switches 14 and 16. Trigger circuits 18, 20, 22 and 24 are of the type that generate an electrical pulse of short duration when "triggered" by the reception of an electrical signal and are also well-known in the art. Upon receiving electrical signals from flip flop switches 14 and 16, trigger circuits 18 and 22 or 20 and 24 generate electrical pulses which are amplified by amplifiers 26 and 30 or 28 and 32 depending upon the previous state of flip flop switches 14 and 16. The amplified electrical pulses energize coils 31 and 33 or 35 and 37 of relays 34 and 36 thereby opening or closing the vehicle ignition and starter circuit to disable or enable the vehicle. Thus, if the vehicle anti-theft device of the present invention is in the state illustrated in FIG. 1 wherein the vehicle is enabled, the operator may activate transmitter 10 to send an encode signal to receiver 12 which decodes the signal and sends an electrical pulse to flip flop switches 14 and 16 which change from the state denoted as a to the state denoted as a' and send electrical signals to trigger circuits 18 and 22 which generate electrical pulses that are amplified by amplifiers 26 and 30 to energize coils 31 and 33 to actuate and open relays 34 and 36 thereby disabling both the ignition and starter circuits of the vehicle. When the vehicle operator wishes to enable the vehicle, the operator activates transmitter 10 to send an encoded signal to receiver 12 which decodes the signal and sends an electrical pulse to flip flop switches 14 and 16 which change from the state denoted as a' to the state denoted as a and send electrical signals to trigger circuits 20 and 24 which generate electrical pulses which are amplified by amplifiers 28 and 32 to energize coils 35 and 37 to actuate and close relays 34 and 36 thereby enabling the ignition and starter circuits of the vehicle.

In one embodiment of the invention, relay 34 is located between the positive terminal of the vehicle battery and the ignition system while relay 36 is used to disconnect the power supply to the vehicle starter. Relays 34 and 36 may advantageously be placed at different locations in the ignition and starter circuits so long as both the vehicle ignition and starter systems are disabled.

An optional keyboard or hidden switch 42, mounted at an appropriate location inside of the vehicle, may be used to provide the encoded signal in the event that transmitter 10 is lost or misplaced. Additionally, those skilled in the art will appreciate that additional circuitry may be added to the vehicle anti-theft device of the present invention to prevent the device from being activated while the vehicle is in operation.

In another embodiment of the invention, a third flip flop switch (not shown) is connected to receiver 12 for operating trigger circuits, amplifiers and relays substantially identical to those illustrated in FIG. 1, except the relays are used to lock and unlock the vehicle door locks. Thus, the vehicle doors may be locked at the same time that the vehicle ignition and starter systems are disabled. It will also be appreciated by those skilled in the art that a fourth flip flop switch may optionally be included and used to arm and disarm an audible alarm of conventional design.

Figure 2:
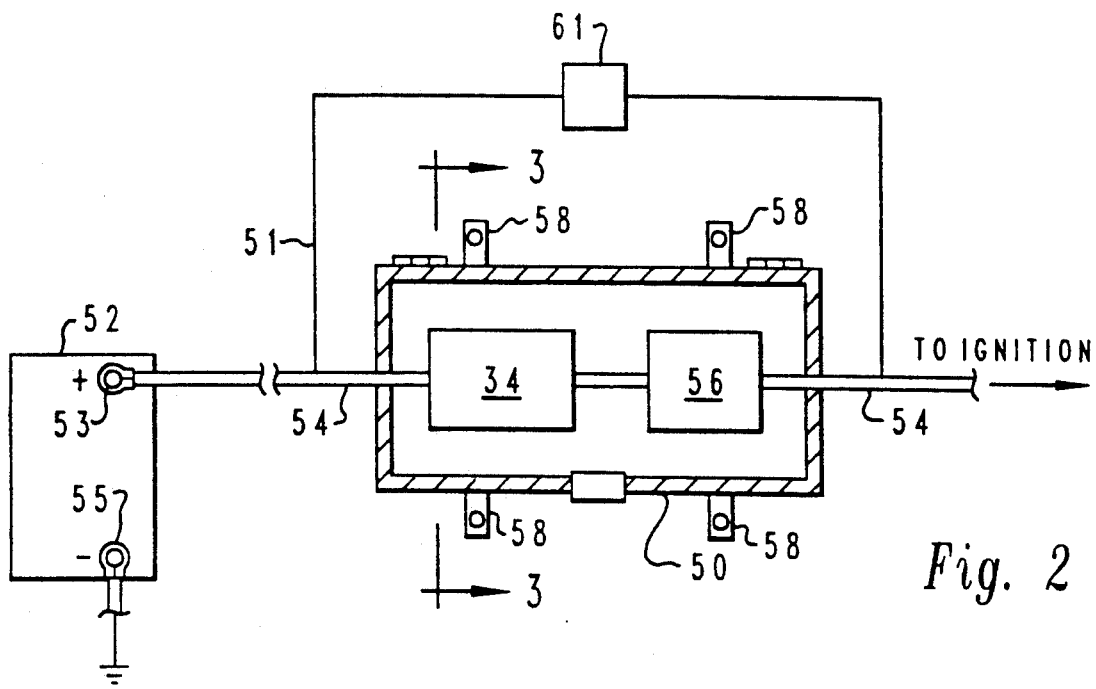
FIG. 2 illustrates a cross section of a locking enclosure and relay employed in one embodiment of the present invention.

Referring now to FIG. 2, vehicle battery 52 comprises a power supply for starting the vehicle and includes positive terminal 53 and negative terminal 55 and is connected to the vehicle ignition system with battery cable 54. An enclosure 50 is provided to enclose a relay 34 for disconnecting battery cable 54 connected to the positive terminal 53 of vehicle battery 52. An optional disconnect switch 56 is provided to disconnect the battery 52 from the vehicle ignition system when the enclosure 50 is opened. A bypass 51 with resistor 61 may be provided to permit the flow of only enough current to flow to operate electronic devices requiring a constant power supply. The enclosure may be cylindrical, as shown, or any other geometry that may be readily adapted to the particular vehicle. The enclosure 50 is preferably formed from steel, high impact plastic or a similar material to prevent tampering with the relay 34. The enclosure 50 may also be provided with brackets 58 for mounting the enclosure within the engine compartment of the vehicle.

Figure 3:
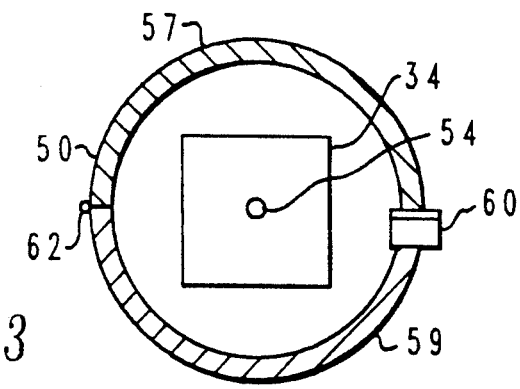
FIG. 3 is a cross section of the enclosure of FIG. 2 taken along line 3—3 of FIG. 2.

Referring now to FIG. 3, the enclosure 50 comprises a two part hinged cylinder with a top portion 57 and a bottom portion 59 connected by one or more hinges 62. The enclosure is provided with a locking device 60 for securing the enclosure 50 in a closed and locked position to prevent tampering with relay 34 and switch 56.

Figure 4:
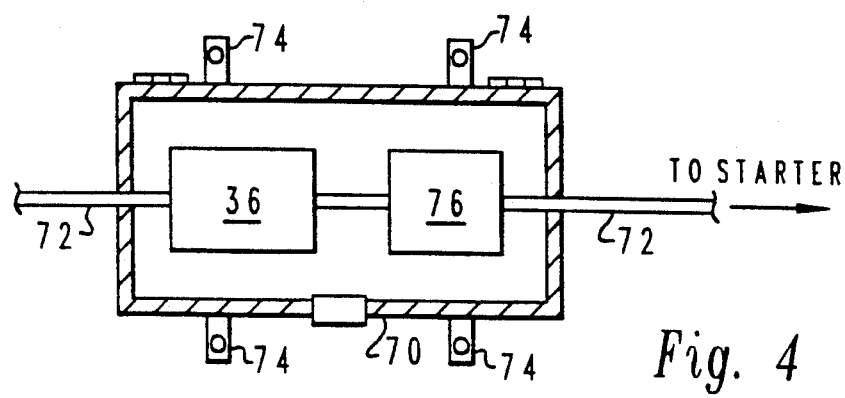
FIG. 4 illustrates a cross section of a second locking enclosure and relay employed in one embodiment of the present invention.

Referring now to FIG. 4, a enclosure 70, similar to that of FIGS. 2 and 3 is illustrated. The power cable 72 to the vehicle starter passes through enclosure 70 which contains relay 36. The enclosure is hinged and is equipped with a locking device (not shown) for securing the enclosure in a closed and locked position to prevent tampering with the relay 36. An optional disconnect switch 76 is provided to disconnect the power cable 72 from the vehicle starter system when the enclosure 70 is opened. The enclosure 70 may be provided with brackets 74 for mounting the enclosure in an appropriate location.

Since the illustrated embodiment of vehicle anti-theft device of the present invention isolates both the vehicle battery and the starter from the ignition system, it cannot be circumvented by merely bypassing the switch that isolates the battery from the ignition system or by connecting an external power source to the ignition system. Moreover, the existence of the switch that isolates the starter will not be readily apparent until after an attempt has been made to circumvent the switch that isolates the vehicle battery. Thus the vehicle anti-theft device of the present invention provides a unique means for disabling a vehicle when not in use thereby providing increased security and theft deterrence for vehicles.

While the invention has been described in connection with the illustrated embodiments, it is not intended to limit the scope of the invention to the particular forms set forth, but, to the contrary, it is intended to cover such alternatives, modifications and equivalents as may be included within the spirit and scope of the invention as defined by the appended claims.

I claim:

1. A vehicle anti-theft device comprising:
 a vehicle having an electrical system including an ignition system and starter;
 a battery for supplying electrical power to the vehicle ignition system, said battery having positive and negative terminals;
 a first relay for providing electrical power to the ignition system;
 a first power cable for connecting said relay to said ignition system;
 a second relay for providing electrical power to the starter;
 a second power cable for connecting said second relay to the starter;
 a pair of amplifiers associated with each of said relays for actuating said relays;

a pair of trigger circuits associated with each of said amplifiers for providing a short duration electrical pulse to said amplifiers when triggered;

first and second flip flop switches for triggering selected ones of said trigger circuits;

a receiver for receiving an encoded signal and providing an electrical pulse to said flip flop switches to trigger selected ones of said trigger circuits when said encoded signal is received;

a first enclosure for enclosing said first relay, said enclosure further comprising a lock for securing said enclosure in a closed position;

a first disconnect switch associated with said first enclosure for disconnecting the first power cable from the ignition when the enclosure is in an open position;

a second enclosure for enclosing said second relay, said enclosure further comprising a lock for securing said enclosure in a closed position;

a second disconnect switch associated with said second enclosure for disconnecting the second power cable from the starter when the enclosure is in an open position; and whereby said first and second relays successively connect and disconnect said ignition system and said starter when actuated.

2. The vehicle anti-theft device of claim 1 further comprising a switch mounted inside the vehicle for activating said trigger circuits.

3. The vehicle anti-theft device of claim 1 further comprising a bypass for providing a limited amount of current to the vehicle electrical system when said first power cable is disconnected.

4. The vehicle anti-theft device of claim 1 further comprising an audible alarm.

* * * * *